United States Patent
Fredrickson et al.

(10) Patent No.: US 8,992,120 B2
(45) Date of Patent: Mar. 31, 2015

(54) MOBILE APPLICATOR FOR THERMO PAVEMENT MARKING

(75) Inventors: Steven H. Fredrickson, Minneapolis, MN (US); Barry W. Mattson, Elk River, MN (US); Christopher A. Lins, Crystal, MN (US); James C. Schroeder, Ramsey, MN (US); Roland M. Bedard, Forest Lake, MN (US); Thomas L. Triplett, Rockford, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 13/980,254

(22) PCT Filed: Jan. 19, 2012

(86) PCT No.: PCT/US2012/021833
§ 371 (c)(1),
(2), (4) Date: Jul. 17, 2013

(87) PCT Pub. No.: WO2012/100025
PCT Pub. Date: Jul. 26, 2012

(65) Prior Publication Data
US 2013/0302091 A1  Nov. 14, 2013

Related U.S. Application Data

(60) Provisional application No. 61/434,050, filed on Jan. 19, 2011.

(51) Int. Cl.
*E01C 23/14* (2006.01)
*E01C 23/20* (2006.01)
(Continued)

(52) U.S. Cl.
CPC ............ *E01C 23/16* (2013.01); *G06F 17/5081* (2013.01); *E01C 23/206* (2013.01); *G06F 2217/12* (2013.01)

USPC .............................................. 404/95; 404/107

(58) Field of Classification Search
USPC ............................................ 404/95, 111, 107
See application file for complete search history.

(56) References Cited

U.S. PATENT DOCUMENTS

| 1,340,131 A | * | 5/1920 | Andresen ........................ 404/95 |
| 1,376,852 A | * | 5/1921 | Andresen ........................ 404/95 |

(Continued)

FOREIGN PATENT DOCUMENTS

| CN | 2135595 Y | 6/1993 |
| JP | 51-34530 A | 3/1976 |

(Continued)

OTHER PUBLICATIONS

The International Search Report and Written Opinion of counterpart International Application No. PCT/US20120/021833 filed Jan. 19, 2012.

(Continued)

*Primary Examiner* — Gary Hartmann
(74) *Attorney, Agent, or Firm* — Kinney & Lange, P.A.

(57) ABSTRACT

A mobile thermoplastic applicator comprises a kettle, a main gas burner, a heat exchanger plenum, and a screed die box. The kettle has walls which define an interior space for melting thermoplastic. The main gas burner is situated beneath the kettle, and is configured to heat the kettle. The heat exchanger plenum is situated inside the thermoplastic kettle and is configured to subdivide the interior space and circulate heated air from the main gas burner. The screed die box is configured to receive molten thermoplastic from the kettle and deposit that molten thermoplastic on a surface.

20 Claims, 10 Drawing Sheets

(51) Int. Cl.
*E01C 23/16* (2006.01)
*G06F 17/50* (2006.01)

(56) References Cited

U.S. PATENT DOCUMENTS

| | | | | |
|---|---|---|---|---|
| 1,546,185 | A * | 7/1925 | Andresen | 404/95 |
| 1,613,736 | A * | 1/1927 | Andresen | 404/95 |
| 4,661,684 | A * | 4/1987 | Sellers | 392/308 |
| 4,732,109 | A * | 3/1988 | Selby | 118/713 |
| 4,831,958 | A * | 5/1989 | Selby | 118/108 |
| 6,093,247 | A * | 7/2000 | Sipos et al. | 118/302 |
| 6,109,826 | A * | 8/2000 | Mertes | 404/95 |
| 6,183,161 | B1 | 2/2001 | Neeper | |
| 6,439,806 | B1 * | 8/2002 | Dillingham | 404/95 |
| 7,008,136 | B2 * | 3/2006 | Hill | 404/107 |
| 8,814,467 | B2 * | 8/2014 | Dawson et al. | 404/95 |
| 8,840,337 | B2 * | 9/2014 | Fredrickson et al. | 404/111 |
| 2007/0116516 | A1 | 5/2007 | Lichtblau | |
| 2013/0294832 | A1 * | 11/2013 | Dawson et al. | 404/94 |
| 2013/0302090 | A1 * | 11/2013 | Fredrickson et al. | 404/94 |

FOREIGN PATENT DOCUMENTS

| | | |
|---|---|---|
| KR | 10-1999-0010704 A | 2/1999 |
| KR | 10-2003-0084842 A | 11/2003 |

OTHER PUBLICATIONS

First Office Action from Chinese Application Serial No. 201280005594.4, dated Dec. 2, 2014, 16 pages.

* cited by examiner

MOBILE APPLICATOR FOR THERMO PAVEMENT MARKING

BACKGROUND

The present invention relates generally to pavement marking, and more particularly to a mobile applicator for marking pavement with thermoplastics.

Alkyd and hydrocarbon thermoplastics are commonly used to mark pavement surfaces with visible lines and symbols such as lane dividers and guide lines. In particular, thermoplastics provide a durable alternative to pavement painting, and are commonly used to mark street intersections, parking lots, and other high-traffic pavement surfaces from which paint would quickly wear away.

Thermoplastics are conventionally applied to pavement surfaces using a mobile applicator comprising a heated reservoir or kettle, and an application screed die. Melted thermoplastic is dispensed from the kettle at a controlled rate and applied in a thin layer atop pavement surfaces with the screed die. Some applicators further comprise secondary burners which heat secondary reservoirs or screed die. Many applicators burn pressurized gas, such as propane and butane, at secondary burners and to heat applicator kettles. Manually driven and self-powered applicators are both relatively common, and some applicators can be attached to and driven by vehicles.

Conventional thermoplastics must be brought to melt temperatures of 177 to 232° C. (350 to 450° F.) prior to application. Existing systems use a central mixer-melter to bring thermoplastics to these temperatures. Once melted, a load of thermoplastic from the central mixer-melter is transferred to the kettle of a mobile applicator for pavement marking. The applicator kettle is heated to prevent thermoplastic from cooling below application temperatures before it is applied to the pavement surface. Often, a single central mixer-melter may service a plurality of applicators on a job site.

SUMMARY

The present invention is directed toward a mobile thermoplastic applicator comprising a kettle, a main gas burner, at least one heat exchanger plenum, and a screed die box. The kettle has walls which define an interior space for melting thermoplastic. The main gas burner is situated beneath the kettle, and is configured to heat the kettle. The heat exchanger plenum is situated inside the kettle and is configured to subdivide the interior space and circulate heated air from the main gas burner. The screed die box is configured to receive molten thermoplastic from the kettle and deposit that molten thermoplastic on a surface.

DETAILED DESCRIPTION

Mobile Applicator Overview

Figure 1:
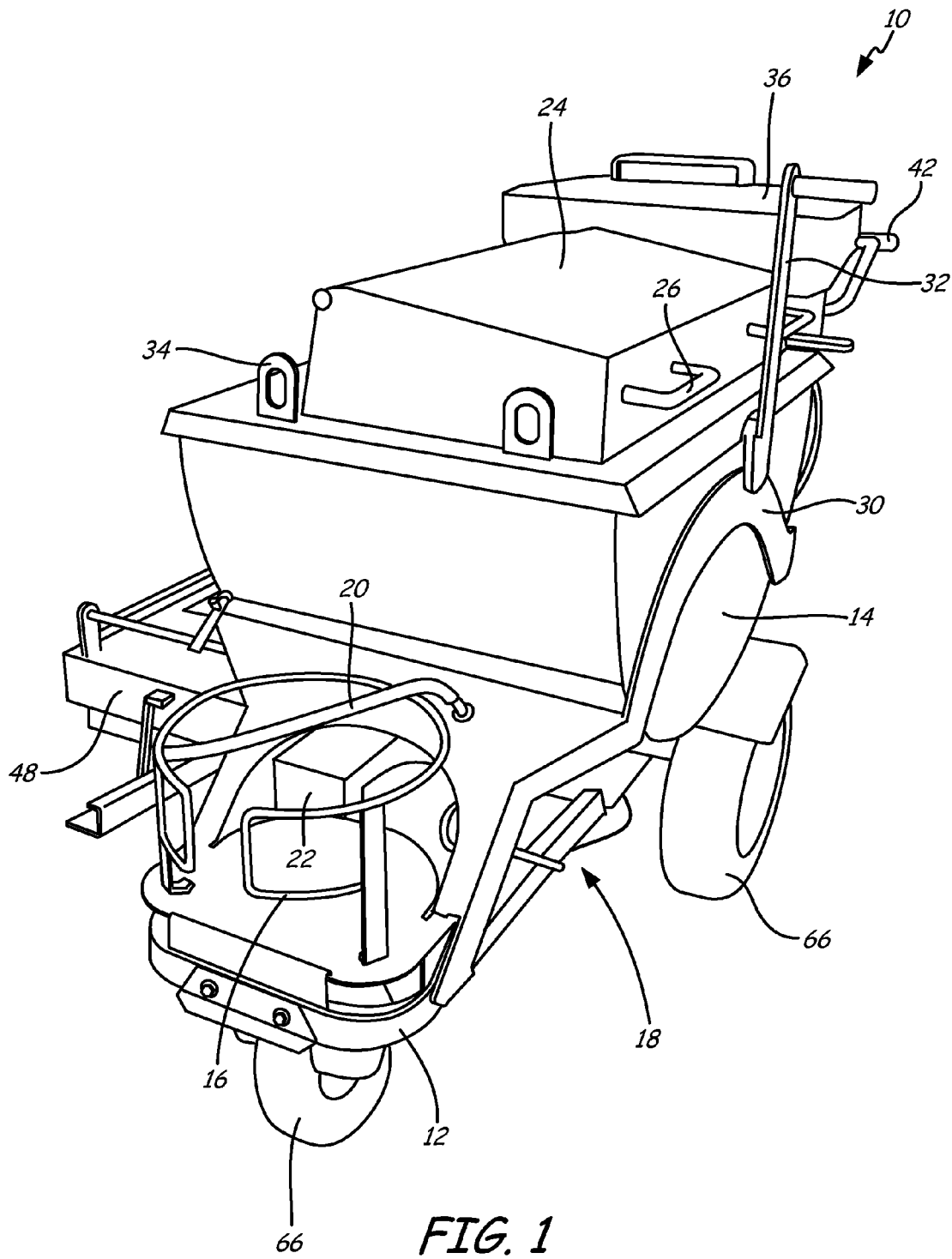
FIG. 1 is a first perspective view of a mobile applicator of the present invention.
Figure 2:
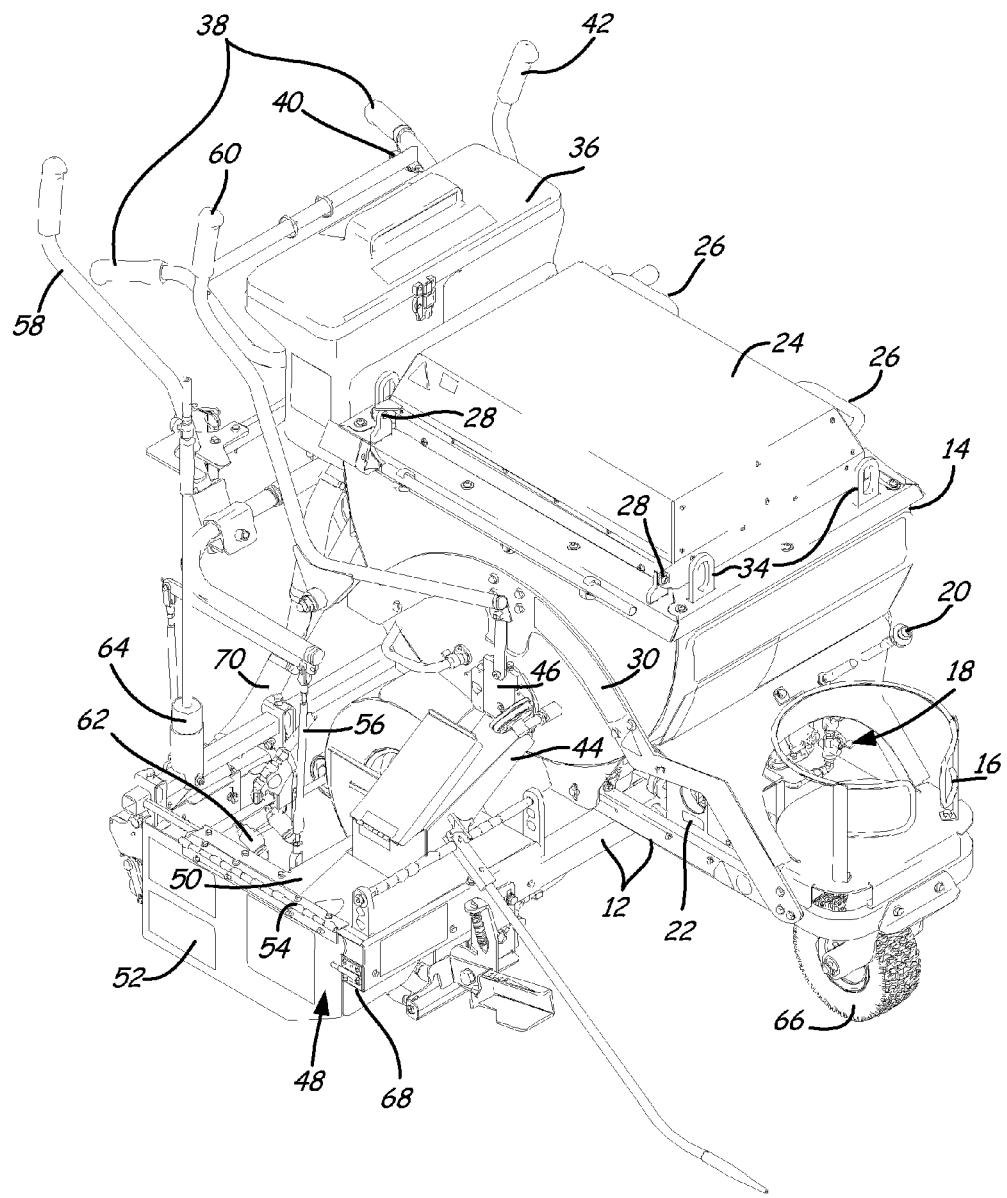
FIG. 2 is a second perspective view of the mobile applicator of FIG. 1.

FIGS. 1 and 2 are perspective views of mobile applicator 10 that will be discussed simultaneously. Mobile applicator 10 comprises frame 12, kettle 14, gas tank cradle 16, gas system 18 (with gas tank hookup 20 and gas safety valve 22), kettle lid 24 (with lid handles 26 and lid hinges 28), kettle supports 30, agitator arm 32, lifting eyes 34, bead reservoir 36, push bar 38 (with handbrake 40), agitator lever 42, chute 44, gate valve 46, screed enclosure 48 (with screed enclosure top 50 and screed shroud door 52 connected at shroud door hinges 54), screed actuator link 56, screed actuator lever 58, gate valve lever 60, screed box burners 62, hand torch 64, wheels 66, shroud door latch 68, and bead tube 70.

Mobile applicator 10 is a tool capable of marking pavement lines by melting and then applying thermoplastic a pavement surface. Mobile applicator 10 includes frame 12 which provides support for other components of mobile applicator 12. Frame 12 may, for instance, be comprised of a framework of aluminum and/or steel beams, tubes, and struts. Gas tank cradle 16 is attached to frame 12 at the forward end of frame 12. Gas tank cradle 16 is a holding structure sized to retain a tank of propane, butane, or other appropriate combustible gas. Wheels 66 are rotatably attached to the bottom of frame 12 and allow mobile applicator 10 to move along pavement. In the depicted embodiment, mobile applicator 10 includes three wheels 66: a single front wheel which swivels and provides directional control, and two rear wheels which track behind the front wheel. Push bar 38 is attached at the aft of frame 12 and includes handbrake 40. Push bar 38 allows a user to propel mobile applicator 10 and handbrake 40 allows the user to stop applicator 10, such that the user can direct where the pavement lines are made. One skilled in the art can appreciate that although directional terms such as "forward", "aft", "bottom", "top", "right side", and "left side" have been used in describing this invention, but such terms are merely relational descriptors of the illustrated embodiments shown herein.

Mounted to the top of frame 12 is kettle 14, which is a receptacle that is heated to melt granular thermoplastic for application to pavement surfaces. In the illustrated embodiment, kettle 14 is a substantially hemi-cylindrical receptacle heated from below by a plurality of gas burners. Kettle 14 may, for instance, be formed of aluminum. Kettle 14 is attached to frame 12 via kettle supports 30, which are rigid struts or surfaces formed, for instance, of steel or aluminum.

Kettle lid 24 covers the open top of kettle 14 and prevents molten thermoplastic, thermoplastic vapor, and heat from escaping from kettle 14 during operation. Kettle lid 24 can be opened and closed with lid handles 26, which are attached to the left side of kettle lid 24. In some embodiments, kettle 14 may include latches which allow kettle lid 24 to be locked shut. Kettle lid 24 is connected to kettle 14 via lid hinges 28 which are on the right side of kettle lid 24 (opposite of lid handles 26). Lid hinges 28 may be any sort of conventional hinge selected for heat resilience and resistance to fouling when exposed to melted thermoplastic. In addition, kettle 14 includes agitator arm 32 which is connected to a plurality of agitators inside kettle 14 used to stir the molten thermoplastic.

Also attached to the top of kettle 14 are lifting eyes 34. Lifting eyes 34 are attachment points that allow mobile applicator 10 to be hoisted into position or loaded onto or off of a transportation vehicle. In the illustrated embodiment, lifting eyes 34 are tabs with holes which extend from the top surface of kettle 14, but a person skilled in the art will recognize that lifting eyes 34 may generally be any sort of load-bearing anchors for a hoist or crane, and could, for instance, be located on frame 12, instead.

At the bottom right side of kettle 14 is gate valve 46. Gate valve 46 is positioned between the interior of kettle 14 to chute 44. Chute 44 is a rigid, heat-resistant chute or trough which guides molten thermoplastic from kettle 14 to the screed die box. Chute 44 is comprised of a heat-resistant material including, but not limited to, aluminum or steel.

As stated previously, gas tank cradle 16 holds a tank of combustible gas (not shown), and gas from this tank is utilized by gas system 18. Gas system 18 is largely located beneath kettle 14 and kettle supports 30, and is anchored to frame 12. Gas system 18 includes gas hookup 20, a fluid connection which receives gas from a tank at gas tank cradle 16. Gas system 18 also includes gas safety valve 22, and a plurality of other valves and gas distribution tubes. Gas safety valve 22 is an electrically actuated multi-path valve which controls gas flow to pilot burners and main burners heating kettle 14. Gas system 18 provides combustible gas to burners which heat kettle 14, and to screed box burners 62 and hand torch 64. Hand torch 64 is a handheld burner which can be used by a human operator to touch up or remove thermoplastic applied using mobile applicator 10 and is therefore located at the aft of mobile applicator 10. In addition, screed box burners 62 are connected to gas system 18.

Screed enclosure 48 is anchored to frame 12 at the bottom right side of frame 12. Screed enclosure 48 includes screed enclosure top 50 and screed shroud door 52. Screed enclosure 48 surrounds screed box burners 62 and the screed die box (see FIG. 3, below). Screed enclosure top 50 partially covers the screed die box, and screed shroud door 52 is connected to screed enclosure top 50 by shroud door hinges 54, such that screed shroud door 52 can be pivoted upward from door hinges 54 to reach, remove, or insert the screed die box. Screed shroud door 52 is secured to frame 12 by shroud door latch 68, which holds shroud door 52 in the depicted (closed) position during operation of mobile applicator 10. Screed enclosure 48 shields the screed die box from wind and debris and conversely shields the operator from the molten thermoplastic therein.

In order to operate mobile applicator 10, a user ignites pilot burners and main burners under kettle 14. Then the user opens kettle lid 24 and deposits a sack of granular thermoplastic atop heat exchanger plenums located inside kettle 14. The sack itself is formed of a meltable thermoplastic material, so heat from main burners 116 melts the sack and the granules. The user can then rotate agitator arm 32 back and forth across a substantially 180° range, thereby sweeping the agitators through the interior of kettle 14 so as to mix the thermoplastic as it melts. Alternatively, the user can attach agitator arm 32 to agitator lever 42, allowing the user to move agitator arm 32 from the aft of mobile applicator 10.

Once the thermoplastic is uniformly melted, the user can pull gate valve lever 60, which opens gate valve 36. Opening gate valve 36 allows thermoplastic from kettle 14 to flow down chute 44 into the screed die box (shown in FIG. 3). Screed box burners 62 heat the screed die box, allowing the thermoplastic to remain molten as it is dispensed. In addition, light reflective beads are commonly used to provide increased visibility to thermoplastic stripes, for some applications. These beads, which are usually formed of glass, are deposited on freshly applied molten thermoplastic. Some embodiments of mobile applicator 10 include bead reservoir 36 (located at the top aft of mobile applicator 10), which is a receptacle for storing such glass beads. Bead tube 70 carries beads from bead reservoir 36 to screed enclosure 48, allowing beads to be deposited as thermoplastic is applied.

The components and configuration of mobile applicator 10 as shown in FIGS. 1 and 2 allow for a bag of thermoplastic granules to be transformed into a pavement line.

This occurs by mobile applicator 10 melting the thermoplastic in kettle 14, transferring the melted thermoplastic into a screed die (shown in FIG. 3) via gate valve 46 and chute 44, and dispensing the molten thermoplastic onto the pavement. A pavement line is formed as the user propels mobile applicator 10.

FIGS. 1 and 2 depict one embodiment of the invention, to which there are alternatives. For example, mobile applicator 10 can include mounting points such that mobile applicator 10 can be attached to a motor vehicle. In such an embodiment, the motor vehicle pushes and/or pulls mobile applicator 10 in order to direct where the pavement lines are made.

Figure 3:
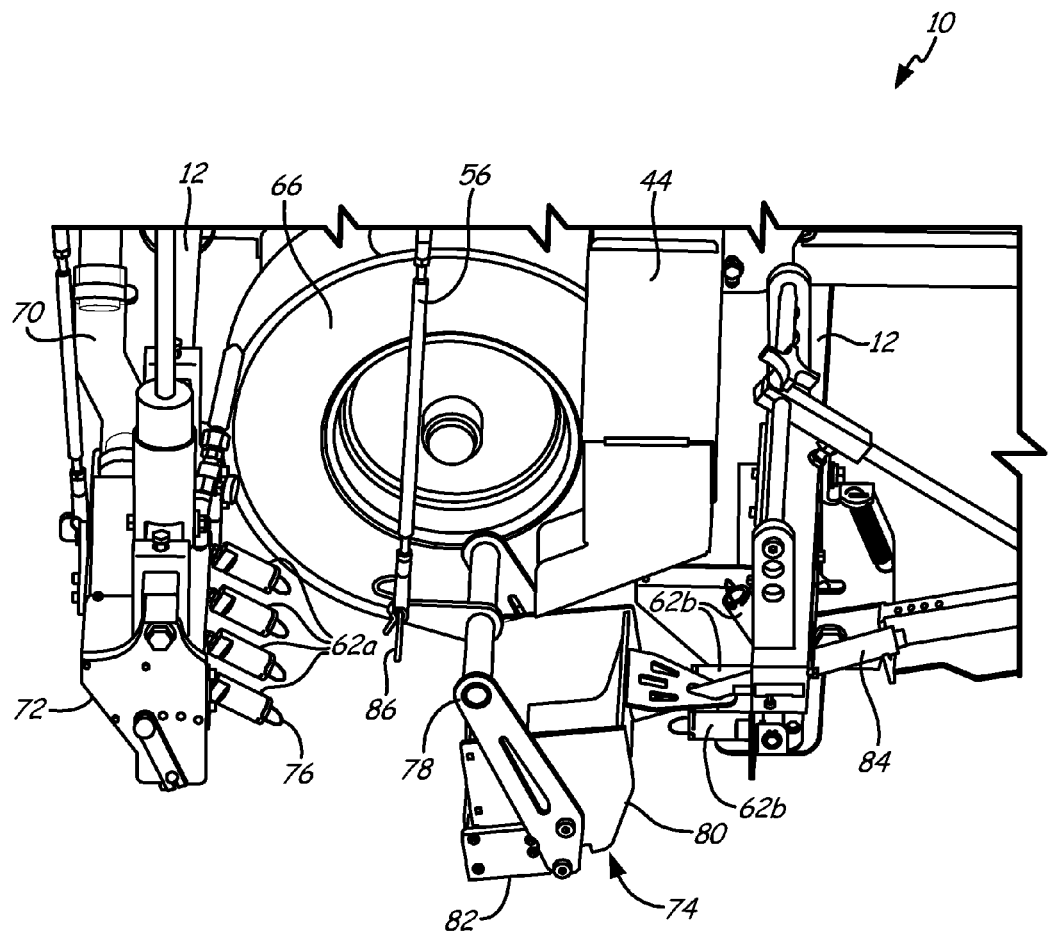
FIG. 3 is a perspective view of a screed die box of the mobile applicator of FIG. 1 and surrounding components.

FIG. 3 provides a close-up view of die box 74 and surrounding components of mobile applicator 10, with screed enclosure 48 removed for increased visibility. FIG. 3 depicts frame 12, chute 44, screed actuator link 56, screed burners 62 (including four aft screed burners 62a and three fore burners 62b), wheel 66, bead tube 70, bead dispenser 72, screed die box 74, and flame indicators 76. Screed die box 74 comprises screed die box lever 78, screed die box bucket 80, screed die box gate 82, screed die box anchor 84, and retention pin 86.

As stated above with respect to FIGS. 1 and 2, screed die box 74 is positioned beneath chute 44 in order to receive molten thermoplastic from chute 44. Screed die box 74 is primarily comprised of screed die bucket 80, a five-sided container open on top to receive thermoplastic from chute 44. Screed die bucket 80 is anchored relative to other components of mobile applicator 10 by screed die box anchor 84, which is welded to or integrally formed on the forward side of bucket 80. In the illustrated embodiment, screed die box anchor 84 is an elongate post which extends through and can be locked into place relative to frame 12. Screed die box anchor 84 can be locked in place to frame 12 anywhere along the length of die screed die box anchor 84, allowing the position of screed die box 74 to be adjusted for different applications. A person skilled in the art will recognize that screed die box 74 could alternatively be anchored to frame 12 by other flexible or inflexible means, and that screed die box anchor 84 could accordingly take other forms which equivalently allow screed die box 74 to be secured to frame 12. Screed die box anchor 84 may double as a handle used by operators to install, remove, and transport screed die box 74.

Screed die box lever 78 attaches to screed die box gate 82. The screed die box gate is a slidable plate along the bottom of screed die bucket 80. Screed die box lever 78 is detachably attached to screed actuator link 56 by means of retention pin 86, and is fastened to screed die box gate 82. When screed actuator lever 58 (shown in FIG. 2) is pulled or pushed, a torque is applied to screed die box lever 78 via screed actuator link 56, which opens or closes screed die box gate 82. Screed die box gate 82 opens and closes by shifting forward or aftward to create or remove an open space in the bottom of screed die box bucket 80. Screed die box 74 may have a plurality of distinct embodiments with different dimensions and additional features for use in different applications, any of which may be freely swapped in and out of mobile applicator 10 by fastening screed die box 74 to frame 12 using screed die box anchor 84, and attaching screed die box lever 78 to screed actuator link 56 with retention pin 86.

Also shown in FIG. 3, bead dispenser 72 is attached to frame 12 and supports aft screed burners 62a. Bead dispenser 72 receives and deposits visibility-enhancing beads from bead tube 70, as understood in the art. In addition, fore burners 62b are supported by frame 12 and are located forward of screed die box 74.

Screed die box 74 is heated by screed burners 62, to ensure that thermoplastic deposited in screed die box 74 from chute 44 remains molten during the application process. As stated previously, all screed burners 62 receive combustible gas from gas system 18. Screed burners 62 include aft screed burners 62a, which are directed to an aft portion of screed die box 74, and fore screed burners 62b. Although the embodiment of mobile applicator 10 depicted in FIG. 3 includes four aft screed burners 62b and three fore screed burners, a person skilled in the art will understand that the number and placement of screed burners may be varied without departing from the spirit of the present invention. In particular, some embodiments of mobile applicator 10 may not include aft screed burners 76. Alternatively, one or both of aft and fore screed burners 62a and 62b, respectively, may be modular components which may be connected to gas system 18 if and when desired. As shown in FIG. 3, two of fore screed burners 62b are directed to a fore portion of screed die box 74 near where screed die box anchor 84 attaches to screed die box bucket 80, while a third screed burner 62b is directed at chute 44 to prevent thermoplastic from solidifying in chute 44. As depicted, all screed burners are ignited manually, although a person skilled in the art will recognize that automatic ignition tools such as electrical sparkers may be utilized instead.

The components and configuration of mobile applicator 10 as shown in FIG. 3 allow for molten thermoplastic to be applied to pavement. Screed burners 62 heat die box 74 and chute 44, allowing molten thermoplastic to flow smoothly from kettle 14 into screed die box 74 and maintaining thermoplastic in screed die box 74 in a molten state. By pulling screed actuator lever 58 (shown in FIG. 2), an operator can deposit molten thermoplastic from screed die box 74 onto a pavement surface.

Conventional mobile thermoplastic applicators carry molten thermoplastic in a heated kettle, but are poorly suited to actually melting granular thermoplastic. Melting is conventional done with a central melter, as described above with respect to the Background of the present invention. Mobile applicator 10, by contrast, incorporates several elements which collectively enable rapid, safe, and uniform melting of granular thermoplastic within kettle 14 of mobile applicator 10 itself. These elements include gas system 18 (identified above, and described in further detail below with respect to FIGS. 4-6), a plurality of kettle features including heat exchanger plenums (heat exchanger plenums 326, described below with respect to FIGS. 7 and 8) and agitators (agitators 306, described below with respect to FIGS. 7 and 9).

Gas System

Figure 4:
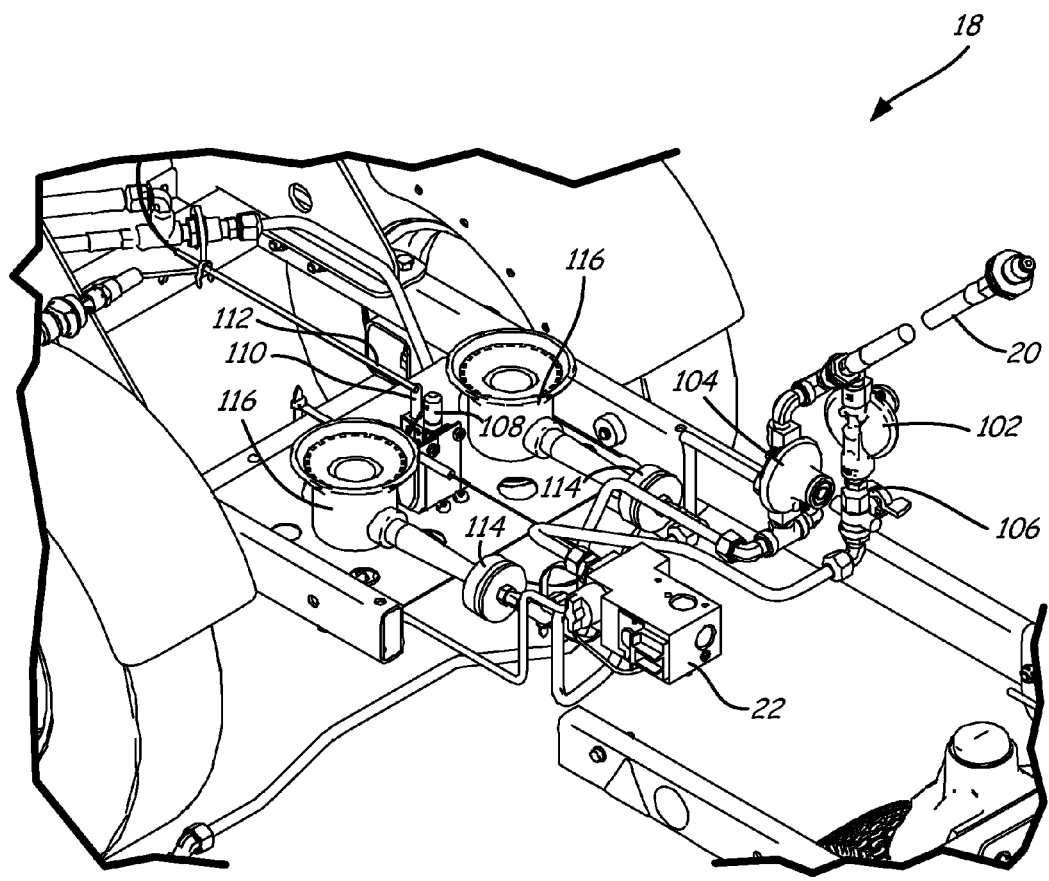
FIG. 4 is a perspective view of a portion of a gas system of the mobile applicator of FIG. 1.
Figure 5:
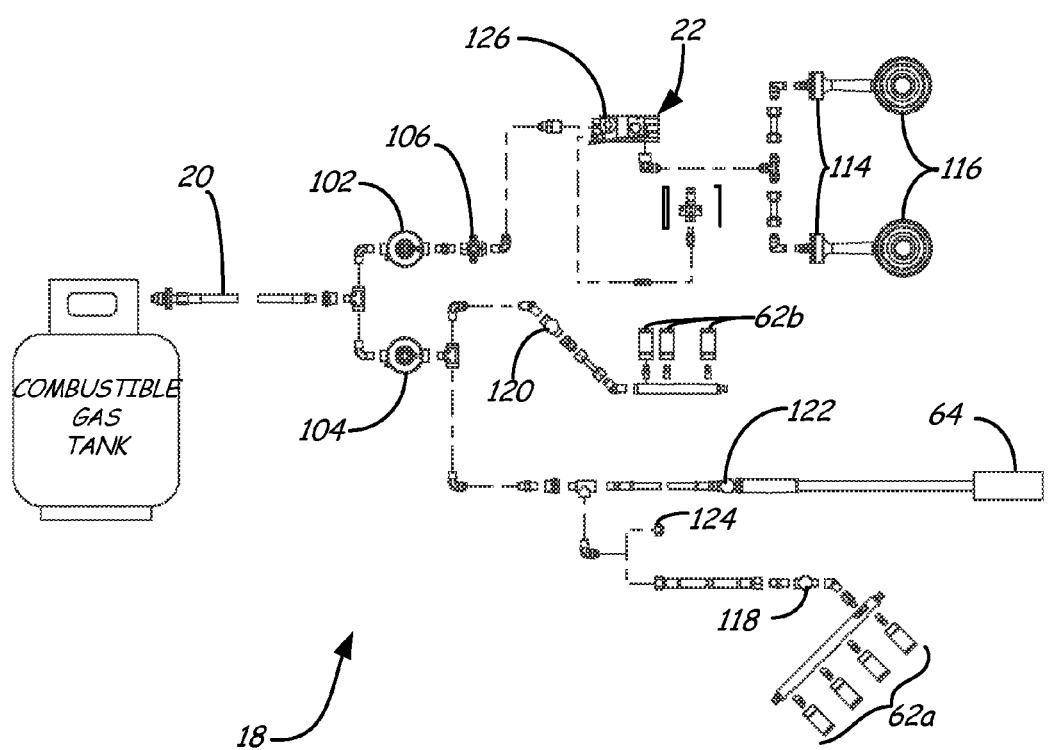
FIG. 5 is a schematic diagram of the gas system of FIG. 4.

FIGS. 4 and 5 depict gas system 18 of mobile applicator 10. FIG. 4 depicts components of gas system 18 located below kettle 12 and kettle supports 30 (see FIGS. 1 and 2), while FIG. 5 provides a diagram of the entirety of gas system 18. Gas system 18 includes gas tank hookup 20, gas safety valve 22, aft screed burners 62a, fore screed burners 62b, main burner gas regulator 102, secondary gas regulator 104, main burner manual shutoff valve 106, pilot burner 108, thermopile 110, spark-igniter 112, mixing valves 114, main burners 116, aft screed burner valve 118, fore screed burner valve 120, and hand torch valve 122, and gas cap 124. Gas safety valve 22 includes plunger switch 126.

Gas tank hookup 20 receives pressurized combustible gas from a gas tank situated in gas tank cradle 16, as described above with respect to FIGS. 1 and 2. This gas is provided to in parallel to main burner gas regulator 102 and secondary gas regulator 104. Main burner gas regulator 102 provides gas to main burners 116, which heat kettle 14. Secondary gas regulator 104 provides gas to screed burners 62 (including aft screed burner 62a and fore screed burner 62b) and hand torch 64. Main burner gas regulator 102 and secondary gas regulator 104 operate at fixed pressures which may differ. For example, in one embodiment main burner gas regulator provides gas at 34 kPa (5 psi), while secondary gas regulator 104 provides gas at 124 kPa (18 psi). Main burners 116 may, by way of example, be inspirated gas burners. Main burners 116 and screed box burners 62 expel jets of pressurized gas from outlet nozzles. These jets of pressurized gas, when lit, serve as torches which heat nearby components of mobile applicator 10, such as kettle 14 and screed die box 74.

Gas flow from main burner regulator 102 is controlled by manual shutoff valve 106, which may for instance be a plug or ball valve. Manual shutoff valve 106 is opened when mobile applicator 10 is in use, and closed for increased safety when mobile applicator 10 is not in use. Manual shutoff valve 106 is fluidly connected to gas safety valve 22, which has at least two gas flow paths. A first gas flow path provides gas through mixing valves 114 to main burners 116, and is electrically actuated. Mixing valves 114 draw in and mix combustion air with combustible gas. Main burners 116 jet this mixture of air and combustible gas toward kettle 14, where it is ignited by pilot burner 108. A second gas flow path provides gas to pilot burner 108, which is used to ignite main burners 116. As shown in FIG. 4, pilot burner 108 is situated adjacent to thermopile 110 and spark-igniter 112.

Gas safety valve 22 includes a plunger switch 126, a three-position manual switch used by an operator to start main burners 116. In a first position of plunger switch 126, gas safety valve 22 is completely closed, and provides no gas to pilot burner 108 or main burners 116. In a second position plunger switch 126 can be depressed to open the second gas path, providing gas to pilot burner 108 and allowing an operator to light pilot burner 108 with spark-igniter 112, a conventional manually operated electric sparker. Once pilot burner 108 is lit, plunger switch 126 may be switched to a third position wherein both the first and second gas paths of gas safety valve 22 are open, allowing gas to flow to mixing valves 114 and main burners 116.

Heat from lit pilot burner 108 produces a voltage across thermopile 110, which is formed from a plurality of stacked electrical thermocouples. The first gas flow path through gas safety valve 22 to main burners 116 is normally closed, opening only in response to voltage from thermopile 110, and only when plunger switch 126 is in the third position. Accordingly, gas safety valve 22 only allows gas to flow to main burners 116 when pilot burner 108 is alight and heating thermopile 110. In this way, gas safety valve 22 prevents dangerous gas leakage when main burners 116 are cold. Gas safety valve 22 receives voltage from thermopile 110 via a temperature regulation circuit described below with respect to FIG. 6, which toggles gas flow to main burners 116 on or off to match a desired temperature at kettle 14 and avoid overheating.

Gas flow from secondary gas regulator 104 feeds aft and fore screed burners 62a and 62b, respectively, as well as hand burner 64. Gas to aft screed burners 62a is controlled by aft screed burner valve 118, which can be manually adjusted to vary the gas provided to aft screed burners 62a, and consequently the heat of the burn of aft screed burners 62a. Gas to fore screed burners 62b is similarly controlled by fore screed burner valve 120, and gas to hand torch 64 is controlled by hand torch valve 122. In one embodiment, aft screed burner valve 118, fore screed burner valve 120, and hand torch valve 122 are all needle valves, although a person skilled in the art will recognize that other kinds of continuously or incrementally adjustable valves may perform be substituted.

Gas cap 124 is seal cap which replaces aft screed burners 62a in embodiments wherein aft screed burners 62a are modular, removable components. Gas cap 124 seals gas system 18 against leakage when aft screed burners 62a are not installed. Although gas cap 124 is shown as replacing aft screed burners 62a, gas caps may similarly be included for other gas lines, such as lines to aft screed burners 62b or hand torch 64, in embodiments wherein those burners are removable.

Figure 6:
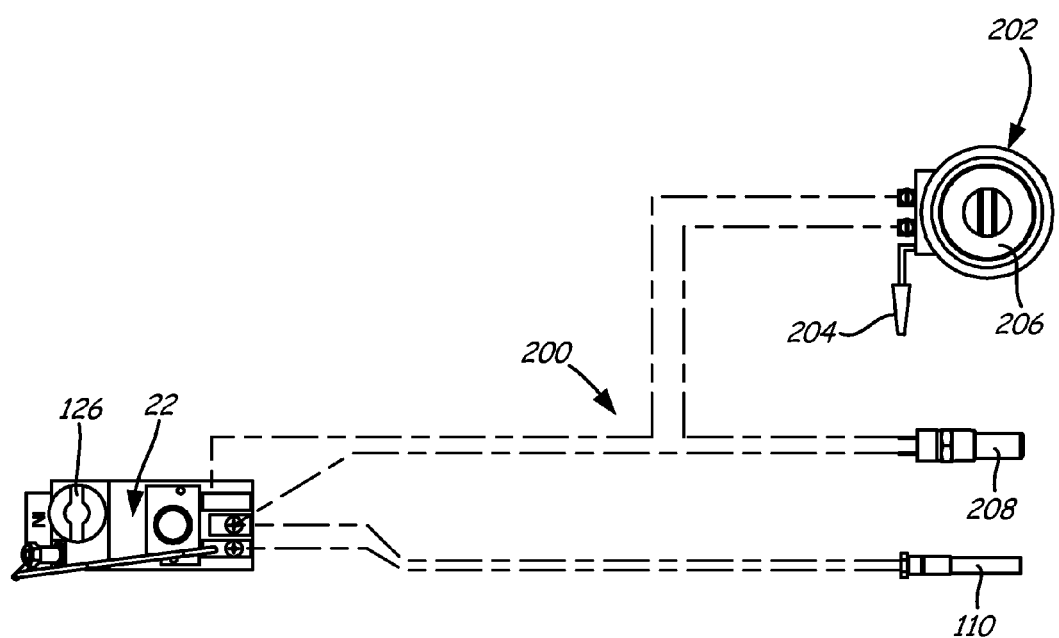
FIG. 6 is a schematic diagram of a temperature control electrical circuit of the gas system of FIG. 4.

FIG. 6 depicts temperature control circuit 200, an electrical circuit which carries voltage from thermopile 110. Temperature control circuit 200 includes gas safety valve 22 (with plunger switch 126), thermopile 110, temperature controller 202 (with oil capillary 204 and temperature dial 206), and over-temperature switch 208.

In order for gas safety valve 22 to provide gas to main burners 116, plunger switch 126 must be in the third position, as described above with respect to FIGS. 4 and 5, thermopile 110 must be hot (and consequently producing a voltage), and both temperature controller 202 and over-temperature switch 208 must be closed. Gas flow to main burners 116 is interrupted whenever temperature controller 202 or over-temperature switch 208 are open, thereby prevented kettle 14 from overheating. Gas flow to main burners 116 is likewise interrupted whenever thermopile 116 ceases to produce a voltage (typically because the flame of pilot burner 108 has been extinguished), thereby preventing gas leakage from unlit burners.

Temperature controller 202 is a conventional temperature-actuated switch with an adjustable cutoff temperature. Oil in oil capillary 202 thermally expands and contracts, opening or closing an electrical contact based on the temperature of oil capillary 204 relative to a temperature selected by an operator with temperature dial 206. Oil capillary 204 abuts kettle 14, so that temperature controller 202 closes temperature control circuit 200 so long as the temperature of kettle 14 remains below the temperature selected with temperature dial 206. Temperature controller 202 opens temperature control circuit 200 when the temperature of kettle 14 exceeds the temperature selected with temperature dial 206. In some embodiments, the temperature at which temperature controller 202 opens temperature control circuit 200 may be separated from the temperature at which temperature controller 202 closes temperature control circuit 200 by a deadband temperature range. By way of example, if the temperature dial is set at 150° C. (302° F.), temperature controller 202 may break temperature circuit 200 as soon as the temperature at kettle 14 exceeds 150° C. (302° F.), but not close temperature circuit 200 again until the temperature drops back below 142° C. (288° F.): a 8° C. deadband range. Because the first gas flow path of gas safety valve 22 is electrically actuated, and normally closed, gas safety valve 22 shuts off gas flow to main burners 116 whenever temperature controller 202 acts as an open switch; that is, whenever the temperature of kettle 14 exceeds the temperature set with temperature dial 206.

Over-temperature switch 208 operates similarly to temperature controller 202, albeit without an adjustable cutoff temperature. Over-temperature switch 208 provides a failsafe switch to prevent kettle 14 from overheating, and abuts kettle 14. Over-temperature switch 208 is normally closed, but opens whenever the temperature of kettle 14 exceeds a preset, non-adjustable safety limit (e.g. 250° C./480° F.). This safety limit is preset at the time of manufacturing to protect components of mobile applicator 10, and to prevent kettle 14 from ever reaching temperatures sufficient to ignite melting thermoplastic.

Temperature control circuit 200 regulates the temperature of kettle 14 by controlling the flow of pressurized combustible gas through gas safety valve 22 to main burners 116. Thermopile 110 improves fire safety by ensuring that no gas flows to main burners 116 when pilot burner 108 is not lit. Together, temperature control circuit 200 and thermopile 110 improve operator and equipment safety, and allow the temperature of kettle 14 to be closely controlled.

Kettle Features

Figure 7:
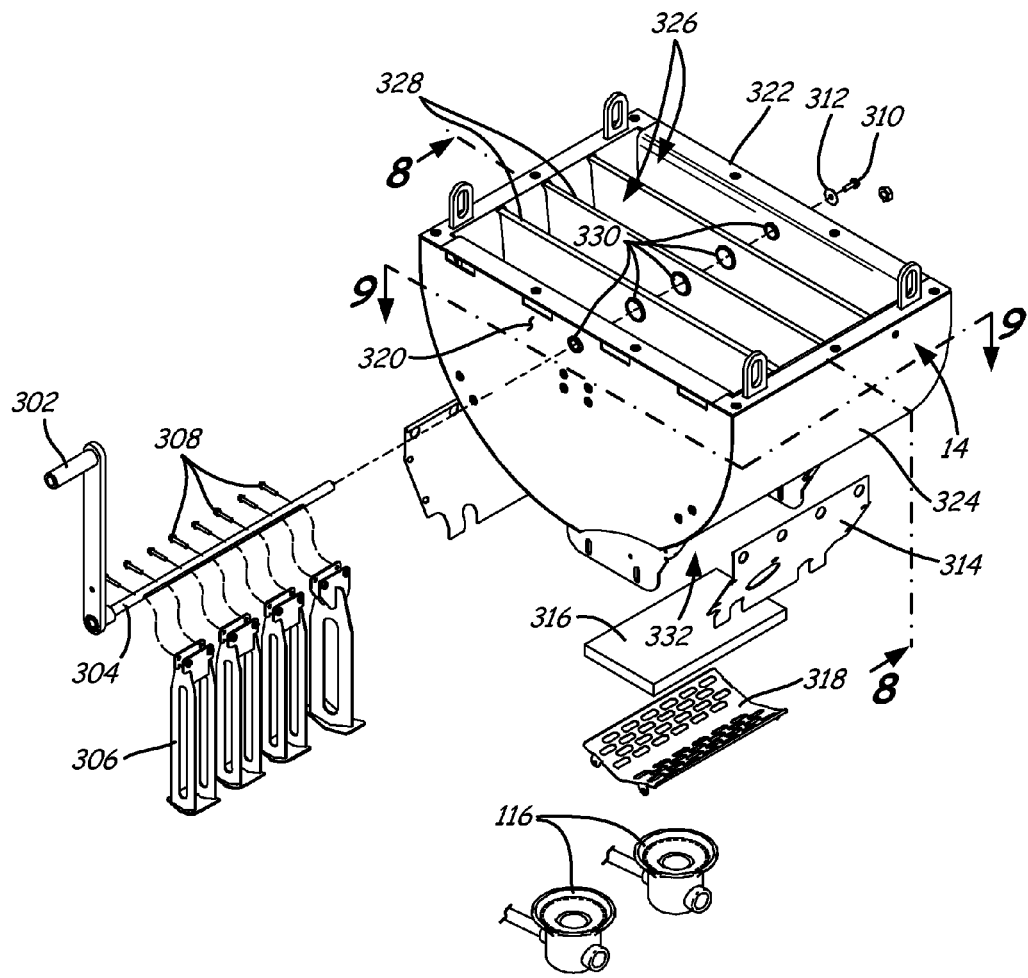
FIG. 7 is an exploded view of a kettle assembly of the mobile applicator of FIG. 1.

FIG. 7 provides an exploded view of kettle 14 of mobile applicator 10, and surrounding components including agitator arm 32 (having agitator handle 302), main burners 116, agitator shaft 304, agitators 306, agitator pins 308, shaft pin 310, shaft washer 312, side shield 314, insulated baffle 316, and retention screen 318. Kettle 14 includes front wall 320, rear wall 322, and cylindrical wall 324, which together define interior space 326. Interior space 326 is subdivided by heat exchanger plenums 328. Front wall 320, rear wall 322, and heat exchanger plenums 328 have agitator shaft holes 330, and cylindrical wall 324 includes opening 332. FIG. 7 further depicts section 8-8 through one heat exchanger plenum 328, and section 9-9 horizontally through kettle 14. These sections indicate the views of FIGS. 8 and 9, respectively.

Front wall 320, rear wall 322, cylindrical wall 324, and heat exchanger plenums 328 are hollow walls formed of a rigid, heat tolerant material, and heat conductive such as aluminum. Air heated by main burners 116 passes into cylindrical wall 324 through opening 332 (see FIG. 8 for greater detail), an opening into cylindrical wall 324 situated immediately over burners 116. Heated air then passes through heat exchanger plenums 328, front wall 320, rear wall 322, and cylindrical wall 324, as described in greater detail below with respect to FIGS. 8 and 9. Front wall 320, rear wall 322, cylindrical wall 324, and heat exchanger plenums 328 together form a fluid-air heat exchanger which improves heat transfer from main burners 116 to thermoplastic in interior space 326.

Insulated baffle 316 is clamped to cylindrical wall 324 over a portion of opening 332 by retention screen 318. Insulated baffle 316 is a compressible thermal insulator such as a ceramic fiber thermal blanket, and serves to shield portions of kettle 14 situated immediately over main burners 116 from the intense heat of burners 116. Retention screen 318 is a rigid, heat-resistant plate or screen with a plurality of holes or perforations, and may for instance be formed of high temperature alloy steel. Retention screen 318 is secured to kettle 14, thereby retaining insulated baffle 316 over main burner 116. Side shields 314 direct hot air from main burners 116 through opening 332 and into heat exchanger plenums 328, and protect surrounding components (not shown) from the heat of main burners 116. Side shields 314, retention screen 318, and insulation baffle 316 are described in further detail below with respect to FIG. 8.

Agitators 306 are rigid bladed stirrers attached to agitator shaft 304 by agitator pins 308. Agitator shaft 304 rides through agitator shaft holes 330 in heat exchanger plenums 328, front wall 320, and rear wall 322, and is secured with shaft washer 312 and shaft pin 310. Shaft pin 310 is a conventional bolt or pin which rides freely over shaft washer 312, retaining agitator shaft 304 in agitator shaft holes 330. Agitator shaft 304 terminates in agitator arm 32 with agitator handle 302. By turning agitator handle 302 to rotate agitator shaft 304, an operator can sweep agitators 306 through interior space 326, breaking up insulating clumps of granular thermoplastic and stirring the mixture of melted and unmelted thermoplastic during the melting process. Agitators 306 are described in greater detail below with respect to FIG. 10.

Thermoplastic acts as a thermal insulator in its granular, unmelted state. Consequently, thermoplastic can melt non-uniformly, leaving pockets of granular thermoplastic surrounded by melted material. Heat exchanger plenums 328 improve melt uniformity by providing a plurality of heat exchange surfaces distributed throughout interior space 326. Agitators 306 further improve melt uniformity by stirring and shearing both melted and unmelted thermoplastic within interior space 326.

Figure 8:
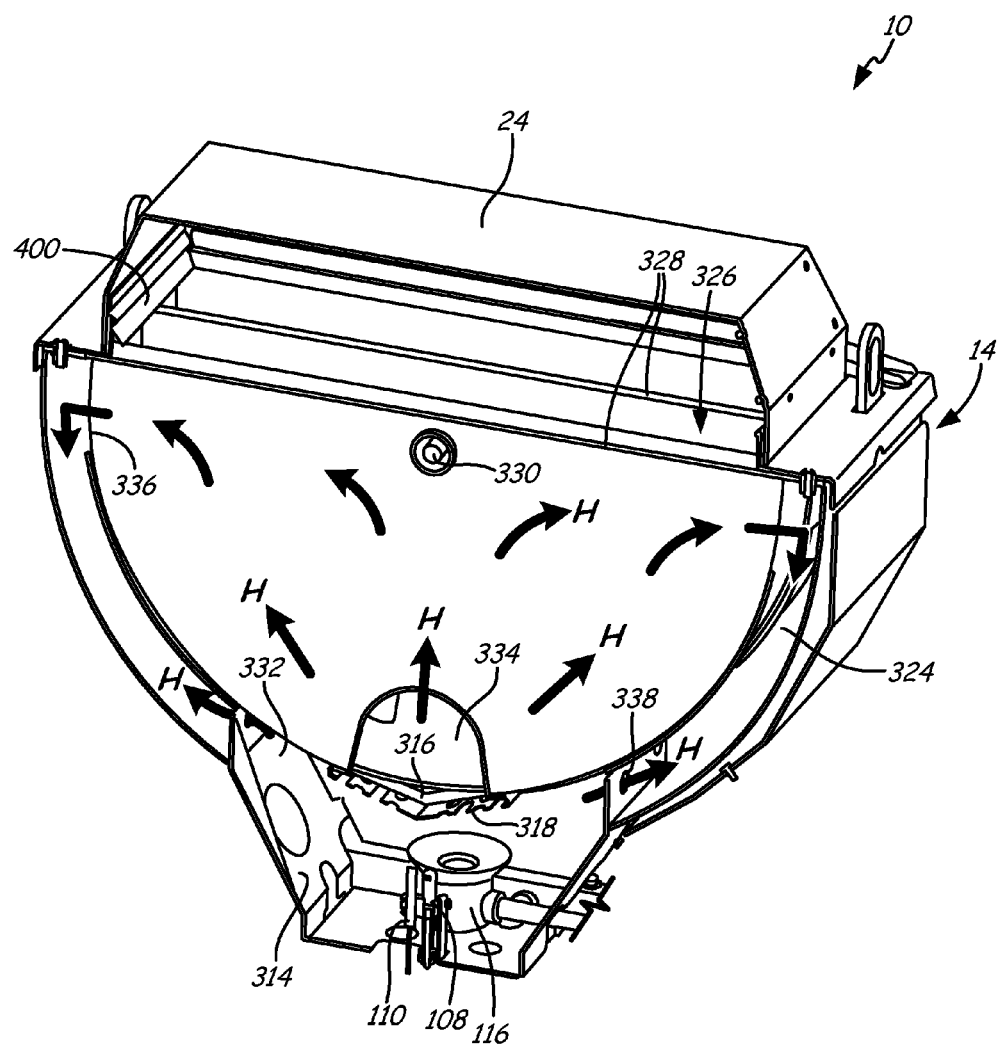
FIG. 8 is a cross-sectional perspective view of the kettle assembly of FIG. 7.

FIG. 8 provides a sectional view of kettle 14 of mobile applicator 10, and surrounding components, through section 8-8 (See FIG. 7), which passes through the hollow interior of a heat exchanger plenum 328, and between main burners 116. FIG. 8 depicts kettle 14, kettle lid 24, pilot burner 108, thermopile 110, side shield 314, main burner 116, insulated baffle 316, retaining screen 318, cylindrical wall 324, heat exchanger plenums 328, agitator shaft hole 330, opening 332, fluid passage 334, air passage 336, air holes 338, and lid seal 400. Kettle lid 24 covers kettle 14, fully enclosing interior space 326 together with cylindrical wall 324, front wall 320, and rear wall 322.

As described above, main burner 116 is ignited by pilot burner 108 when voltage from thermopile 110 enables gas safety valve 22 to supply main burner 116 with combustible gas. Heat exchanger plenums 328 and cylindrical wall 324 are hollow, and receive heated air from main burner 116 via opening 332. Side shields 314 direct the majority of this are into heat exchanger plenums 328, but include air holes 338 to allow some airflow directly into and out of cylindrical wall 324. As indicated by heat flow arrows H, hot air is free to pass between heat exchanger plenums 328 and cylindrical wall 324 at air passages 336, a plurality of openings at the topmost interior extent of cylindrical wall 324 which fluidly connect heat exchanger plenums 328 with cylindrical wall 324. Insulated baffle 316 shields heat exchanger plenums 328 and cylindrical wall 324 from extreme heat directly over main burners 116, dispersing that heat across a wider area. Insulated baffle 316 helps to eliminate localized hot spots in kettle 14 over main burners 116, thereby improving heating uniformity and reducing thermal stresses to kettle 14.

Each heat exchanger plenum 328 has a fluid passage 334 through its lowest extent, which allows molten thermoplastic to move freely between regions of interior space 326 separated by heat exchanger plenums 328. Although fluid passage 328 is depicted as a single passage through each heat exchanger plenums 328, a person skilled in the art will recognize that a plurality of passages fluidly connecting interior space 326 might equivalently be included.

As shown in FIG. 8, air flows along heat flow arrows H through the hollow interior of each heat exchanger plenum 328, entering heat exchanger plenums 328 through openings 332 above burner 116, and flowing from heat exchanger plenums 328 into cylindrical walls 324 via air passages 336. This airflow provides continuous and substantially uniform heating to the entirety of interior space 326, rapidly melting granular thermoplastic deposited therein.

Figure 9:
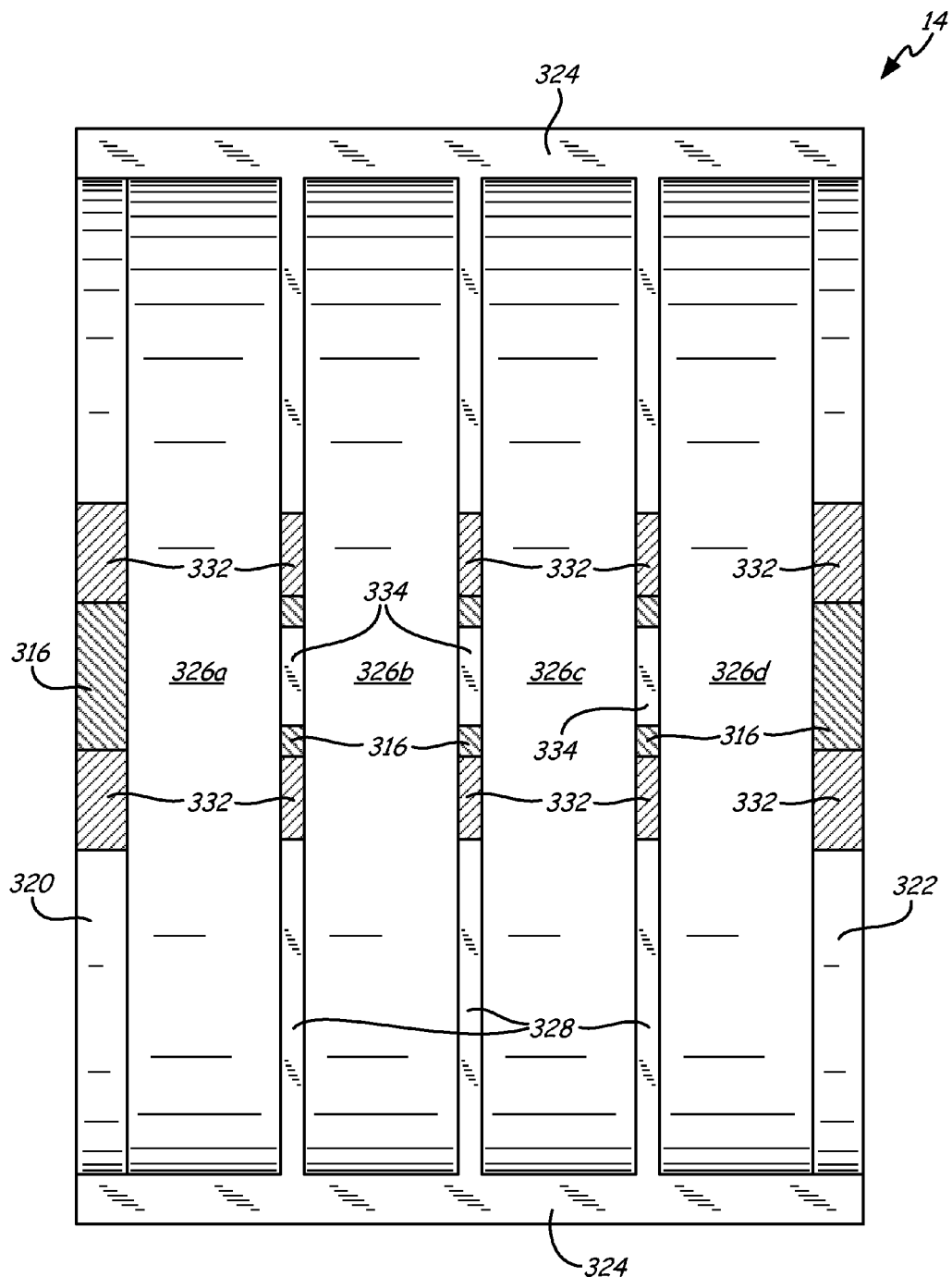
FIG. 9 is a second cross-sectional view of the kettle assembly of FIG. 7.

FIG. 9 provides a sectional view of kettle 14 of mobile applicator 10 through horizontal section 9-9 (see FIG. 7), looking down into kettle 14 from above. FIG. 9 depicts kettle 14, front wall 320, rear wall 322, cylindrical wall 324, interior space 326, heat exchanger plenums 328, opening 332, fluid passages 334, and insulated baffle 316. As described above with respect to FIGS. 7 and 8, front wall 320, rear wall 322, and cylindrical wall 324, and heat exchanger plenums 328 are hollow, and receive hot air from main burners 116 through opening 316 in the bottom portion of cylindrical wall 324. Opening 316 is partially covered by insulated baffle 316 (see FIG. 8), which protects kettle 14 from the intense heat produced immediately above main burners 116. Fluid passages are 326 located below section line 9-9, but are visible from above in FIG. 9. As described above with respect to FIG. 8, fluid passages 326 allow molten thermoplastic to flow freely between adjacent regions of interior space 326 (herein labeled 326a, 326b, 326c, and 326d) separated by heat exchanger plena 328. One agitator 306 is located within each section 326a-d, and can be swept through this region to stir and shear molten and granular thermoplastic. For clarity, agitators 306 are not shown in FIG. 9, but are separately illustrated below, with respect to FIG. 10. By subdividing interior space 326 into a plurality of regions 326a-d and providing each region with an agitator 306, the present invention allows molten thermoplastic in interior space 326 to be heated substantially uniformly, allowing thermoplastic to be melted completely and rapidly.

Figure 10:
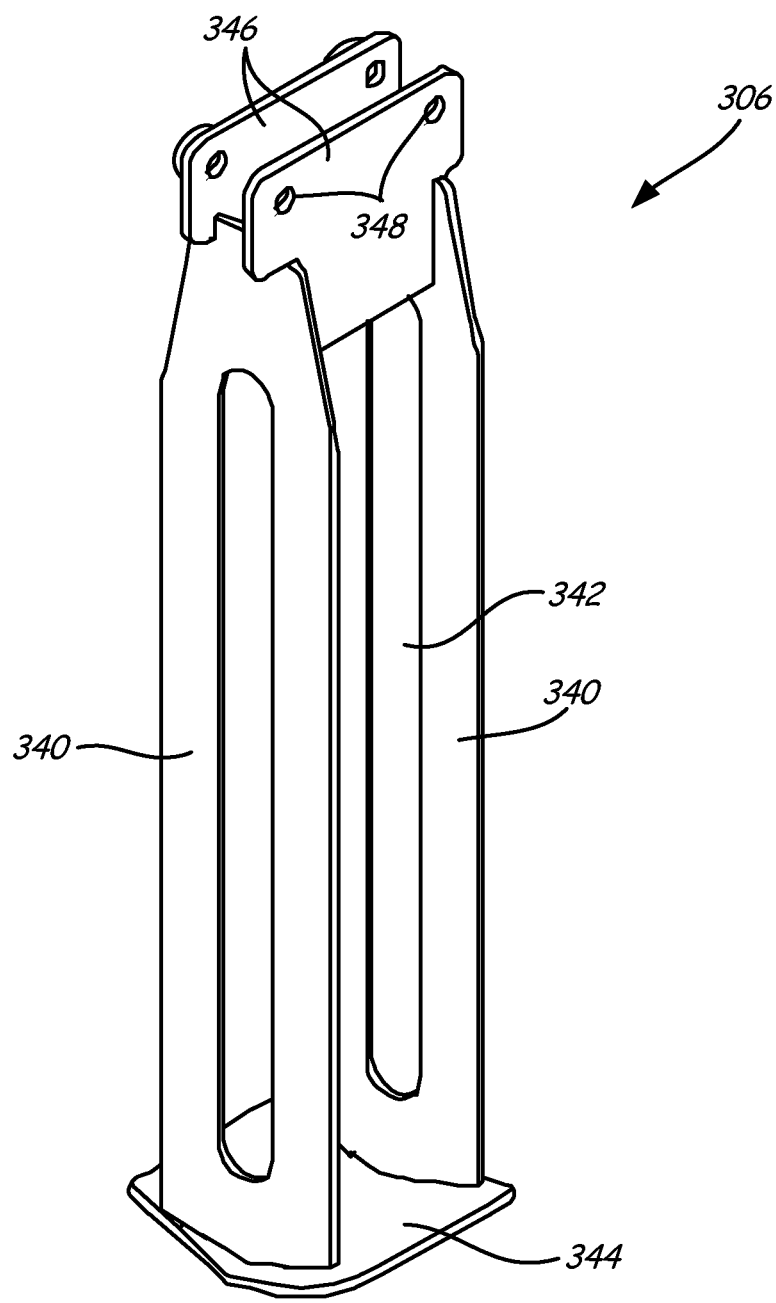
FIG. 10 is a perspective view of an agitator for the kettle assembly of FIG. 7.

As described above with respect to FIG. 7, a plurality of agitators 308 are mounted on agitator shaft 304 to sweep through interior space 326, thereby mixing and shearing molten and melting thermoplastic. FIG. 10 depicts one such agitator 306, having agitator blades 340 (with blade holes 342), agitator cap 344, and agitator axis plates 346 (with agitator pin holes 346).

Agitator blades 340 are parallel planes formed, for instance, of sheet metal. Agitator blades 340 are angled obliquely relative to the axis of agitator shaft 304 so as to apply both axial and a circumferential force components on thermoplastic when swept through interior space 326. Agitator blades 340 are welded or soldered to agitator cap 344 and agitator axis plates 346. Agitator axis plates 346 are parallel plates which receive agitator pins 308 (see FIG. 7) through agitator pin holes 346, anchoring agitator 306 to agitator shaft 304. A person skilled in the art will recognize that other rigid elements, such as tubes and rings, could be used in place of agitator axis plates 346 to anchor agitator 308 to agitator shaft 304. All components of agitator 306 are formed of rigid, heat resistant material such as steel or aluminum. Blade holes 342 run down substantially the entire length of agitator blades 340, increasing mixing turbulence and providing additional edges to agitator blades 340 which help to shear molten and granular thermoplastic. Although FIG. 9 depicts each agitator blade 340 having only a single blade hole 342, a person skilled in the art will understand that other embodiments may equivalently feature a plurality of blade holes 342 running up and down each agitator blade 340. Agitator cap 344 is a v-shaped piece which connects agitator blades 340 at their outer radial extent, and which radially displaces molten thermoplastic when agitators 306 are swept through interior space 326.

Agitators 306 act as stirrers, breaking up clumps of granular thermoplastic during the melting process and moving molten thermoplastic around within interior space 326 for improved heating uniformity. Because blades 350 are angled obliquely relative to the axis of agitator shaft 304, each sweep of agitator 306 through interior space 326 displaces thermoplastic both circumferentially and axially. The V-shape of agitator cap 334 similarly displaces thermoplastic radially when agitator 306 is swept through interior space 326. Agitator blades 340 and agitator cap 344 together increase fluid flow within interior space 326,

CONCLUSION

As described above, the present invention includes numerous gas system and kettle features which allow thermoplastic to be safely, rapidly, and uniformly melted within kettle 14, rather than requiring a separate melter as is conventional. In particular, gas safety valve 22 and temperature control circuit 200 provide improved safeguards which protect both mobile applicator 10, and its operator, while heat exchanger plenums 328 and agitators 306 increase the uniformity of thermoplastic melting within interior space 326.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A mobile thermoplastic applicator comprising:
   a kettle having walls which define an interior space for melting thermoplastic;
   a main gas burner situated beneath the kettle to heat the kettle;
   a heat exchanger plenum situated inside the kettle and configured to subdivide the interior space into a plurality of distinct but fluidly connected sections and circulate heated air from the main gas burner; and
   a screed die box configured to receive molten thermoplastic from the kettle, and to deposit molten thermoplastic on a surface.

2. The mobile thermoplastic applicator of claim 1, wherein the walls of the kettle are hollow, and serve as additional heat exchanger plenums which receive heated air from the main gas burner, and transfer heat into the interior space.

3. The mobile thermoplastic applicator of claim 1, further comprising an agitator moveable within the interior space to break down thermal boundaries in melting thermoplastic via radial, axial, and circumferential shearing.

4. The mobile applicator of claim 3, wherein the agitator is anchored to a rotatable shaft, and comprises a plurality of parallel blades angled obliquely relative to the rotatable shaft.

5. The mobile applicator of claim 4, wherein at least some of the plurality of parallel blades have holes which act as shearing edges for the parallel blades.

6. The mobile thermoplastic applicator of claim 1, further comprising an insulated baffle situated between the main gas burner and the kettle.

7. The mobile thermoplastic applicator of claim 6, wherein the insulated baffle is ceramic fiber blanket clamped to the kettle via a rigid mesh or grate affixed to a bottom portion of the kettle.

8. The mobile thermoplastic applicator of claim 1, further comprising a gas system configured to supply the main gas burner with combustible gas, and having an automatic gas safety valve configured to provide combustible gas to the main gas burner via a gas flow path which is normally closed, and which opens only in response to a voltage received by the automatic gas safety valve.

9. The mobile thermoplastic applicator of claim 8, wherein the voltage is provided by a thermopile situated near a pilot burner, such that the gas flow path opens only when the pilot burner is lit and heating the thermopile.

10. The mobile thermoplastic applicator of claim 8, further comprising a temperature control electrical circuit which interrupts the electric voltage when at least one threshold temperature is exceeded at the kettle, thereby closing the gas flow path.

11. The mobile thermoplastic applicator of claim 1, wherein the heat exchanger plenum is interrupted by a fluid passage connecting the plurality of distinct but fluidly connected sections.

12. A mobile thermoplastic applicator comprising:
    a load bearing frame on wheels;
    a kettle mounted on the load bearing frame, and having hollow walls which define an interior space for melting thermoplastic;
    a heat exchanger plenum situated inside the kettle and configured to subdivide the interior space into a plurality of distinct but fluidly connected sections;
    a main gas burner mounted on the load bearing frame beneath the kettle to heat the kettle, and to heat air which circulates through the heat exchanger plenum and the hollow walls of the kettle;
    an agitator rotatably attached between the heat exchanger and the hollow walls of the kettle, and capable of being swept through the interior space to break down thermal boundaries in melting thermoplastic via radial, axial, and circumferential shearing;
    an insulated baffle situated between the main gas burner and the kettle;
    a gas system supplying the main gas burner with combustible gas, and having an automatic gas safety valve; and
    a screed die box configured to receive molten thermoplastic from the kettle, and deposit molten thermoplastic on a surface.

13. The mobile thermoplastic applicator of claim 12, wherein the automatic gas safety valve is configured to provide combustible gas to the main gas burner via a gas flow path which is normally closed, and which opens only in response to a voltage received by the automatic gas safety valve.

14. The mobile thermoplastic applicator of claim 13, wherein the voltage is provided by a thermopile situated near a pilot burner, such that the gas flow path opens only when the pilot burner is lit and heating the thermopile.

15. The mobile thermoplastic applicator of claim 13, further comprising a temperature controller which interrupts the voltage when a temperature at the kettle exceeds an operator-set threshold temperature.

16. The mobile thermoplastic applicator of claim 13, further comprising an over-temperature switch which interrupts the electric voltage when a temperature at the kettle exceeds a threshold temperature preset at the time of manufacture of the thermoplastic applicator.

17. The mobile thermoplastic applicator of claim 12, further comprising a chute configured to carry molten thermoplastic from the kettle to the screed die box.

18. The mobile thermoplastic applicator of claim 12, wherein the kettle is formed substantially of aluminum.

19. The mobile thermoplastic applicator of claim 12, further comprising a lid having a metal spring steel which interfaces with the kettle, such that the lid and the hollow walls of the of the kettle enclose the interior space.

20. The mobile thermoplastic applicator of claim 11, wherein the fluid passage is situated at a bottommost location of the kettle, over the burner.

* * * * *